US011508090B2

(12) United States Patent
Lin et al.

(10) Patent No.: US 11,508,090 B2
(45) Date of Patent: Nov. 22, 2022

(54) METHODS FOR CALIBRATING OFFSET OF OPTICAL CENTER USING KINEMATIC MOUNT

(71) Applicant: Microsoft Technology Licensing, LLC, Redmond, WA (US)

(72) Inventors: Michael C. Lin, Kirkland, WA (US); Rhishikesh A. Sathe, Bothell, WA (US); Karlton David Powell, Lake Stevens, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/209,029

(22) Filed: Mar. 22, 2021

(65) Prior Publication Data
US 2022/0301225 A1   Sep. 22, 2022

(51) Int. Cl.
*H04N 5/228* (2006.01)
*G06T 7/80* (2017.01)
*H04N 5/225* (2006.01)
*H04N 5/232* (2006.01)
*G06T 3/60* (2006.01)

(52) U.S. Cl.
CPC .............. *G06T 7/80* (2017.01); *G06T 3/60* (2013.01); *H04N 5/2253* (2013.01); *H04N 5/2254* (2013.01); *H04N 5/232127* (2018.08)

(58) Field of Classification Search
CPC ........... G06T 7/80; G06T 3/60; H04N 5/2253; H04N 5/2254; H04N 5/232127
USPC ...................................... 348/222.1
See application file for complete search history.

(56) References Cited

U.S. PATENT DOCUMENTS

| | | | | |
|---|---|---|---|---|
| 7,899,311 B1* | 3/2011 | Kearney | ................ | G03B 37/04 396/419 |
| 2004/0008429 A1* | 1/2004 | Watson | ................... | G02B 7/023 359/819 |
| 2005/0206889 A1* | 9/2005 | Koudelka | .......... | G01B 11/2441 356/239.2 |
| 2008/0218607 A1 | 9/2008 | Shoji et al. | | |

(Continued)

FOREIGN PATENT DOCUMENTS

WO   2020188761 A1   9/2020

OTHER PUBLICATIONS

"International Search Report and Written Opinion Issued in PCT Application No. PCT/US22/019066", dated May 31, 2022, 12 Pages.

*Primary Examiner* — Usman A Khan

(57) ABSTRACT

Systems and methods are provided for calibrating camera and measuring offsets for reducing distortions on images. The calibrating includes aligning an on-board image sensor and a lens barrel using a kinematic mount and affixing the onboard image sensor and the lens barrel to assemble a camera. The kinematic mount provides a predetermined number of degrees of freedom in aligning the on-board image sensor and the lens barrel. A device embeds the camera. The measuring includes receiving the camera in the kinematic mount and measuring an opposing pair of offset values as measured optical centers from the lens optical axis to the image sensor pointing reference at yaw orientations of the camera at 0 degree and 180 degrees. The method determines a total offset value by taking an average of the pair and canceling the rotationally symmetrical error. The method uses the offset value for reducing distortions on images by de-warping.

20 Claims, 12 Drawing Sheets

(56) References Cited

U.S. PATENT DOCUMENTS

| | | | |
|---|---|---|---|
| 2009/0036902 A1* | 2/2009 | DiMaio | A61B 34/71 |
| | | | 606/130 |
| 2015/0192750 A1 | 7/2015 | Shiraishi | |
| 2018/0033131 A1* | 2/2018 | Widman | G06T 7/001 |
| 2018/0077326 A1* | 3/2018 | Powell | G02B 7/003 |
| 2020/0328072 A1* | 10/2020 | Williams | H01J 49/164 |
| 2021/0044725 A1 | 2/2021 | Powell | |

* cited by examiner

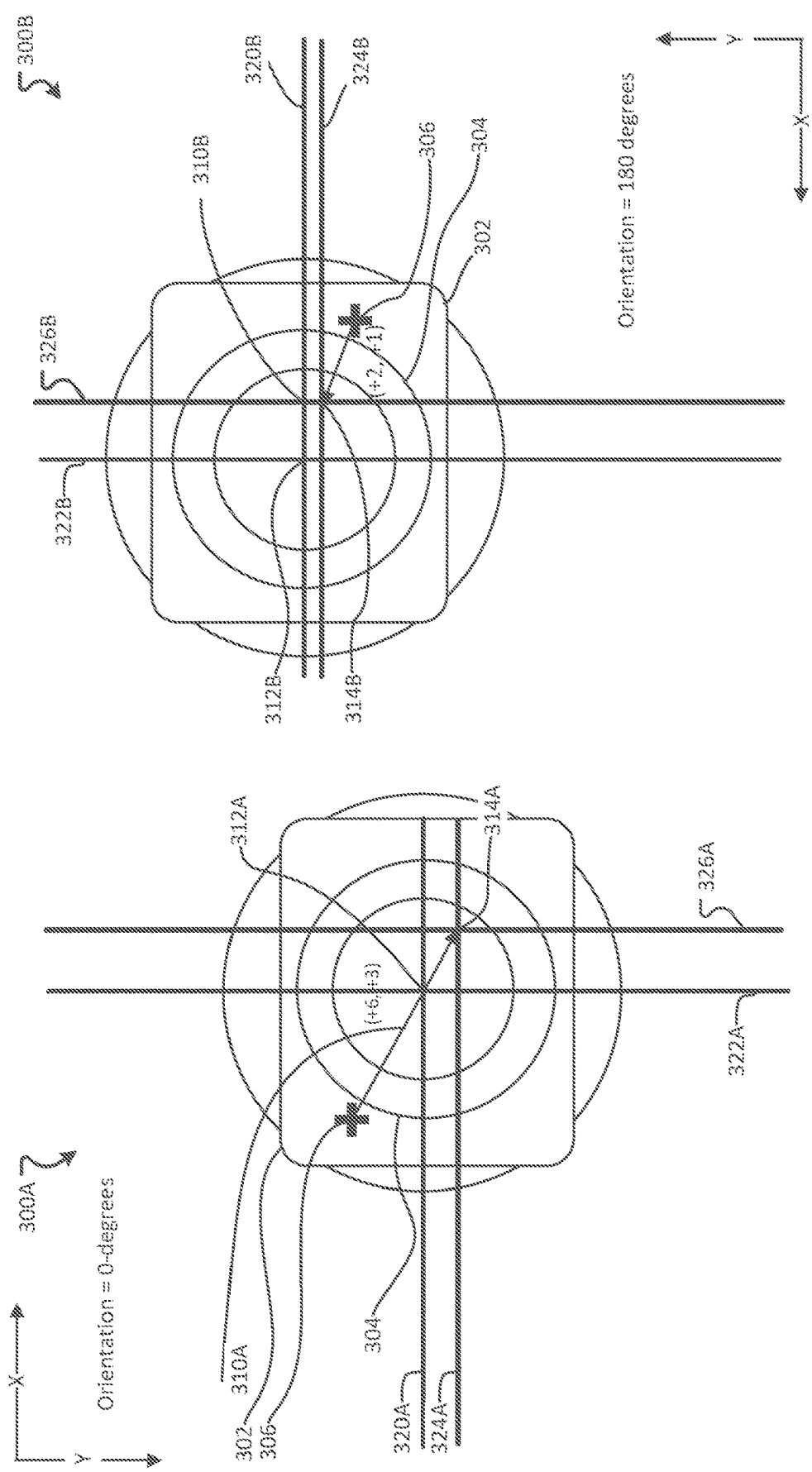

| Orientation 350 | Offset 352 (X, Y) | Measurement Error in Setup 354 (X, Y) |
|---|---|---|
| 0 | (+6, +3) | (+2, +1) |
| 180 | (+2, +1) | (-2, -1) |
| TOTAL (average) | (+4, +2) | (0, 0) |

FIG. 3C

METHODS FOR CALIBRATING OFFSET OF OPTICAL CENTER USING KINEMATIC MOUNT

BACKGROUND

It has become a common place for devices to embed a camera with lens. For example, laptop computers, smartphones, and tablet PCs, include cameras. A physical alignment between the lens and an on-board image sensor is important for capturing images with minimal distortion. An offset of an optical center (i.e., pixel position where the lens optical axis intersects with image sensor) from an image sensor pointing reference may cause captured image distortion and a lack of focus. There are varieties of factors that cause the offset: a lack of uniformity of materials of one or more lenses in a lens barrel, misalignment among lenses inside the lens barrel, misalignment between the lens barrel and the on-board image sensor, and the like.

Calibrating the camera for attaining the physical alignment between the lens barrel and the on-board image sensor takes place during an assembly of the camera and a device. Image processing software on the device reduces distortions when taking pictures. The calibration at the time of camera assembly allows for a higher level of control and a larger magnitude of changes in a physical alignment, as compared to a calibration after assembling the device. On-board processing may reduce distortion in a captured image to an extent that is more limited than adjusting a physical alignment of the parts. Adjusting alignment during assembly with accuracy at a uniform quality level on individual cameras is more costly than software-based adjustment. The adjusting alignment during assembly incurs operational costs in use of fixtures for physically aligning parts. Repeatability becomes an issue in calibrating cameras in bulk. Thus, developing a technology that meets these needs while minimizing tradeoffs would be desirable.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

According to the present disclosure, the above and other issues are resolved by use of a kinematic mount to calibrate a physical alignment between lens and an on-board image sensor for assembling a camera. Additionally or alternatively, the present disclosure measures an offset between a lens optical axis, or an optical center (i.e., a pixel position where the lens optical axis intersects with image sensor) and an image pointing reference (i.e., desired position where the lens optical axis intersects with image sensor) of the assembled camera part for de-warping captured images. In aspects, a lens barrel may enclose a set of lenses as a package. The lens barrel attaches to the on-board image sensor. A physical alignment may take place when affixing the lens barrel and lens holder with a board with the on-board image sensor.

The disclosed technology includes a kinematic mount. The term "a kinematic mount" may also be referred to as a lens barrel mount, an alignment station, and a kinematic alignment fixture. Use of the kinematic mount allows determining with accuracy a position and an orientation of the lens barrel relative to a fixed and/or a calibrated target scene, such that the on-board image sensor may be aligned relative to a lens barrel to reference a target camera pointing accuracy.

The kinematic mount receives the on-board image sensor and the lens barrel for calibrating a relative position and orientation of the on-board image sensor and the lens barrel. The calibration includes determining the position of the on-board image sensor, the position of the lens barrel by measuring an offset of the center of a test image, of calibrated target scene, with a symmetrically flipped image of the test image. The camera is assembled by affixing the on-board image sensor and the lens barrel at the determined position and orientation.

The kinematic mount further receives the camera for determining the optical center of the camera, which represents a total pixel offset value for the camera between the desired pixel pointing position on and image sensor (e.g., pixel position of image sensor center, or other targeted pixel position) and the pixel position where the optical axis intersects the image sensor plane. The kinematic mount determines offset values, or optical center, from the desired pixel pointing position on an image sensor to the lens optical axis, by determining the average offset between desired pixel pointing position and the target features in image at two opposing pair of orientations (e.g., 0 degrees and 180 degrees) of the camera. The disclosed technology generates the total offset value based on the pair of offset values (e.g., an average of the opposing pair of offset values). Errors in the calibrated position of scene target features are substantially canceled out (i.e. "nulled out), providing the optical center data at an accuracy higher than each measurement alone. The generated optical center data may be stored (e.g., in an onboard EEPROM) so as to be accessed by the firmware of the device. An image processor of the device uses the total offset values for reducing distortions of images while the device is in use. The image processor de-warps captured images.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

FIGS. 1A-B illustrate an overview of an example system for aligning parts of a camera and measuring an offset of an optical axis by controlling degrees of freedom in accordance to aspects of the present disclosure.

FIGS. 2A-D illustrate examples of a kinematic mount in accordance with aspects of the present disclosure.

FIGS. 3A-C illustrates examples of offsets and determining offsets of the lens optical axis from the image sensor pointing reference positions in accordance with aspects of the present disclosure.

DETAILED DESCRIPTION

Figure 1A:
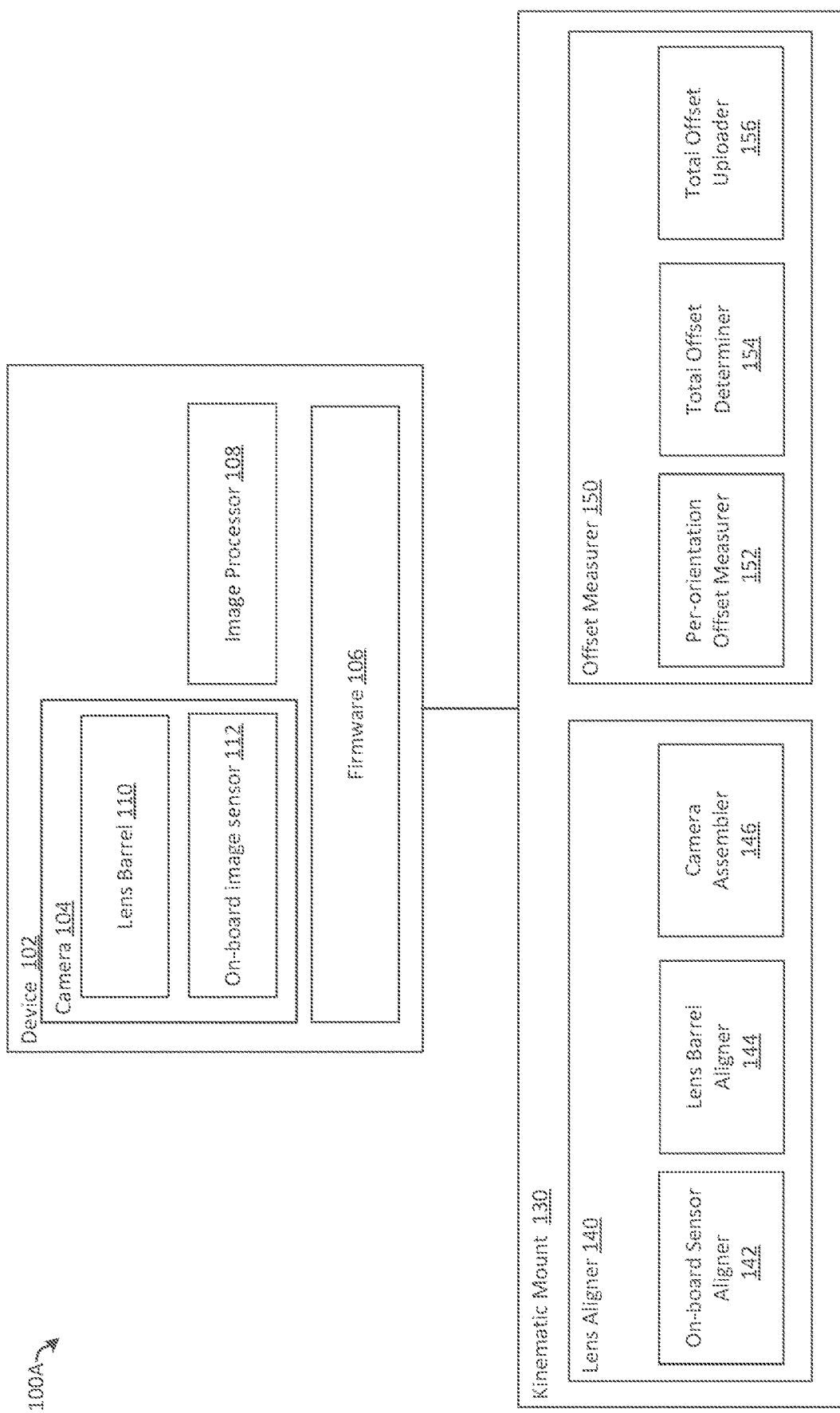

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

A quality of images taken by a device with a camera depends on alignment of an optical axis and an image sensor pointing reference, and/or optical center, associated with various parts of the camera. The parts of the camera embedded on the device may include an on-board image sensor and a lens barrel that encloses a prepackaged set of lenses. In aspects, capturing an image using the device with the embedded camera takes place as follows. First, a light enters the lens barrel. The light passes through a series of lenses, and forms an image on the on-board image sensor of the device. An image processing program then generates a frame of image data based on data from the on-board image sensor. There are varieties of factors that may cause misalignment between the lens optical axis and the optical center. The misalignment results in distortions in a captured image. For example, a physical positioning and an orientation of the on-board image sensor and the lens barrel affect the alignment. A misalignment among lenses within the prepackaged lens barrel may exist. A distortion and non-uniformity of lens materials may misalign the lens optical axis and the image sensor pointing reference. Yet another cause for misalignment may include an offset of one or more lenses inside the prepackaged lens barrel.

The present application solves these issues by providing a system and a method that efficiently calibrate the position and the orientation of the on-board image sensor and the lens barrel when affixing the two parts during manufacturing. Additionally, or alternatively, the disclosed technology measures overall offset values of the lens optical axis from the image sensor pointing references with a higher degree of accuracy than the calibration. An image processor on-board the device uses the overall offset values to correct distortion on captured images by de-warping the captured images. The present application enables balancing competing demands of accuracy and efficiency.

As discussed in more detail below, the present disclosure relates to calibrating a camera and measuring an offset for de-warping. In particular, the calibration and the measurement use a kinematic mount to attain a level of accuracy in measurement by maintaining the on-board image sensor and the lens barrel at a predetermined position and orientation. The kinematic mount further provides repeatable operations in positioning and orienting the on-board image sensor and the lens barrel at a predetermined setting.

FIG. 1A illustrate an overview of an example system 100A for calibrating a camera in accordance with aspects of the present disclosure. System 100A represents a system for determining a physical offset for assembling the camera and determining a total offset of the assembled camera using a kinematic mount. System 100A includes a device 102 and a kinematic mount 130. Examples of the device 102 may include a smartphone, a laptop PC, a tablet, a smart security device, and the like.

The device 102 includes a camera 104, firmware 106, and an image processor 108. The camera 104 includes a lens barrel 110 and an on-board image sensor 112. The lens barrel 110 may include one or more lenses prepackaged and calibrated. The on-board image sensor 112 senses incoming light for capturing an image. Firmware 106 manages processing that occurs on the device 102. Additionally, or alternatively, the firmware 106 receives offset values of the camera 104 and sets the values for the image processor 108 to correct distortion of captured images by de-warping. The image processor 108 processes a captured image in various manners including de-warping the captured image to reduce distortion found in the captured image.

The kinematic mount 130 (a camera assembler) mounts the lens barrel 110 and the on-board image sensor 112 of the camera 104 to serve the following two purposes. The first purpose is to adjust a position and an orientation for assembling the camera 104 by affixing the lens barrel 110 and the on-board image sensor 112. The second purpose is to mount the affixed pieces as the camera 104 to measure and determine an offset between the lens optical axis and the image sensor pointing reference of the camera 104. The kinematic mount 130 may also be referred to as a lens barrel mount or a kinematic alignment fixture. The kinematic mount 130 provides for fixing specific degrees of freedom of kinematics while allowing changes in other degrees of freedom.

Figure 1B:
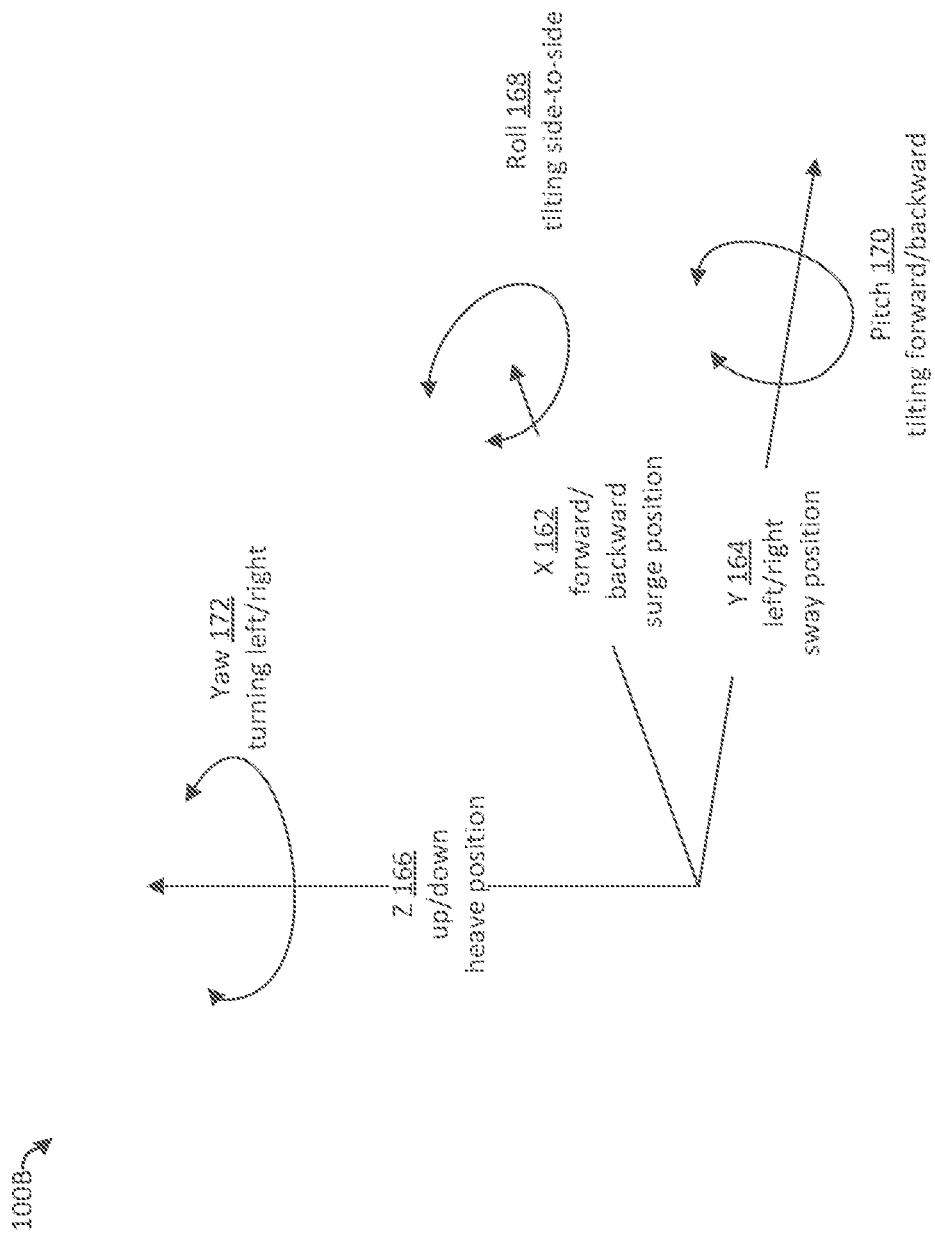

In aspects, the kinematic mount 130 provides two of six degrees of freedom as are shown in FIG. 1B. Of the six degrees of freedom, three relate to positions and the other three relate to orientation. For example, the six degrees of freedom includes: a forward-backward surge position 162 (along the x-axis), a left-right sway position 164 (along the y-axis), an up-down heave position 166 (along the z-axis), a tilting side to side roll orientation 168 about the x-axis (roll), a tilting forward and backward pitch orientation 170 about the y-axis (pitch), and a turning left and right orientation 172 about the z-axis (yaw). The kinematic mount 130 may fix movement in the forward-backward surge position 162, the left-right sway position 164, the side to side roll orientation 168, and the tilting forward and backward pitch orientation 170 by inserting the camera in the kinematic mount 130. That is, the kinematic mount 130 allows adjusting at least the up-down heave position 166 and the turning left and right orientation 172 (yaw) (both with regard to the Z-axis) while calibrating the camera for affixing the lens barrel with the on-board image sensor. The kinematic mount 130 removes all six degrees freedom, except the turning left and right orientation 172 (e.g., rotating the camera with the lens barrel at 0-degrees and at 180-degrees on the z-axis) for measuring offset values between the lens optical axis and the image sensor pointing reference at varying orientations. In aspects, the kinematic mount 130 allows movement of the camera toward either forward or reverse direction on each of the six degrees of freedom. In other aspects, the kinematic mount 130 may control more than six degrees of freedom.

Turning back to FIG. 1A, the kinematic mount 130 includes a lens aligner 140 and an offset measurer 150. The lens aligner 140 aligns an optical axis and an image sensor pointing reference, thereby determining the position and the orientation for affixing the lens barrel with the on-board image sensor. In particular, the lens aligner 140 aligns and affixes the lens barrel and the on-board image sensor during an assembly process of the camera. In aspects, the lens optical axis is a virtual line indicating a path of light through the center of each surface of the lenses in the lens barrel and the on-board image sensor (e.g., 0-degrees field angle). The lens optical axis coincides with the axis of the rotational symmetry in a theoretical case of having no offset error. In practice, there may be an offset, causing the camera to be rotationally asymmetrical. The optical center is the point, or pixel position, where the optical axis of the lens intersects with the image sensor plane for the camera (e.g., the pixel position of the optical center may represent the 0-degrees field pointing angle).

In aspects, a misalignment of less than 1 degree may be unnoticeable by human eyes. A cumulative stack error caused by a combination of various causes of the offsets may be greater than 1 degree. In some aspects, use of the kinematic mount 130 for mounting the lens barrel on the on-board image sensor attains the offset error of less than 0.5 degree. For some imaging applications (e.g., generating a panorama photo by image stitching multiple images), the offset of less than 0.05 degree (i.e., 50 milli-degrees) may be desirable for the stitching of the multiple images to be unnoticeable in the panorama photo.

The lens aligner 140 includes an on-board image sensor aligner 142, a lens barrel aligner 144, and a camera assembler 146. The on-board image sensor aligner 142 aligns the on-board image sensor 112 with the lens image sensor pointing reference positions (e.g., the center or offset pixel position) of the on-board image sensor 112. The lens barrel aligner aligns the lens barrel 110 with the on-board image sensor 112. The lens barrel aligner 144 aligns the lens barrel 110 by adjusting the position and the orientation of the on-board image sensor 112. In aspects, the lens aligner 140 uses image feedback for detecting a rotation error. The lens aligner 140 further corrects a rotational misalignment. In some aspects, the lens aligner 140 captures an image of a horizontally-aligned target, and extracts (e.g., crop) a region of the image containing the lens optical axis at the center of the image. The lens aligner 140 generates a symmetrical (i.e., "flipped) image along the X-axis. The lens aligner 140 determines an absolute value of difference of the flipped image with the cropped image data. Then, the lens aligner 140 aligns the position of the lens barrel by moving the on-board image sensor located underneath the lens barrel at a position and an orientation where the cropped image and the flipped image match.

The camera assembler 146 affixes the on-board image sensor 112 and the lens barrel 110 at the aligned position and the orientation as determined by the combination of the on-board image sensor aligner 142 and the lens barrel aligner 144.

The offset measurer 150 measures an offset between the lens optical axis and the image sensor pointing reference. For example, the offset measurer 150 measures a total offset of the assembled camera and stores the total offset in a memory of the device 102 through the firmware 106 of the device. The device uses an image processor 108 based on the total offset to correct distortions in captured images by de-warping the captured images. In aspects, the offset measurer 150 measures an offset value in the accuracy range of 20 milli-degrees for a subpixel alignment.

The offset measurer 150 includes a per-orientation offset measurer 152, a total offset determiner 154, and a total offset uploader 156. The per-orientation offset measurer 152 measures an offset from the lens optical axis to the image sensor pointing reference at a predetermined position and orientation (e.g., the yaw rotation at 0-degree or 180 degree). In aspects, the per-orientation offset measurer 152 measures the offset for the camera 104 installed in the kinematic mount 130. In aspects, the kinematic mount 130 fixes the five out of the six degrees of freedom of kinematics. The kinematic mount 130 enables rotating the camera 104 on the z-axis (i.e., yaw) at a predetermined degree (e.g., 0-degree or 180 degrees).

The total offset determiner 154 determines a total offset value between the lens optical axis and the image sensor pointing reference based on one or more measured offset values at varying positions and orientations. For example, the total offset determiner 154 may determine the total offset value based on the offset value measured at 0-degrees and another offset value measured at 180-degrees in yaw. In aspects, the total offset determiner 154 may determine the total offset value by determining an average value of the two offset values. For example, when an offset value at 0-degrees is (x, z)=(+6, +3) and the value at 180-degrees is (+2, +1), the total offset value is (+4, +2). In aspects, the total offset value represents an offset of the lens optical axis from the image sensor pointing reference in the camera 104 in the device. For example, the image processor de-warps the image data and corrects distortions of the captured image. As a result, the image processor provides a sub-pixel alignment of captured image.

The total offset uploader 156 uploads the determined total offset value to the firmware 106 of the device 102. When the device 102 is in use, the image processor 108 of the device 102 reads and uses the total offset value to de-warp captured images to remove distortion in the captured images.

As will be appreciated, the various methods, devices, applications, features, etc., described with respect to FIGS. 1A-B are not intended to limit the system 100A to being performed by the particular applications and features described. Accordingly, additional controller configurations may be used to practice the methods and systems herein and/or features and applications described may be excluded without departing from the methods and systems disclosed herein.

FIGS. 2A-D illustrate examples of a kinematic mount according to the aspects of the present disclosure. First, an apparatus 200A illustrates a kinematic mount with a camera. The apparatus 200A includes a target image 202, the kinematic mount 206, and the camera 220. The directional arc 222 illustrates inserting the camera 220 into the kinematic mount 206 by placing the camera 220 in a cavity. A lens retainer plate 208 closes and retains the camera in place. A camera alignment plate 210 slides up and down. The kinematic mount 206 receives the camera 220 that is rotated at an orientation of 0-degrees or 180 degrees for taking offset measurements. The directional arc 224 illustrates the 180- degrees rotation of the camera 220. The camera 220 includes the lens barrel 226 and the on-board image sensor 228. The lens barrel 226 houses one or more lenses inside. An assembly process of the camera 220 includes calibrating the camera 220 by aligning the lens barrel 226 on the on-board image sensor 228 and affixing them. The axis 204 indicates the virtual line through the center of the camera placement and is perpendicular to the target image 202. The degrees of freedom 201A illustrate positions and orientations used in illustrating the apparatus 200A. For example, the axis 204 is along an up-down heave position 166 along the Z-axis. In another example, the up/down movement of camera alignment plate 210 inside the kinematic mount 206 is at an up-down heave position 166 on the Z-axis. The kinematic mount 206 allows one degree of freedom on the Z-axis while locking the camera 220 in all other five degrees of freedom. In yet another example, the rotation as depicted by the directional arc 224 represents a 180-degree "yaw" rotation of the camera 220 on the Z-axis as one degree of freedom.

Figure 2A:
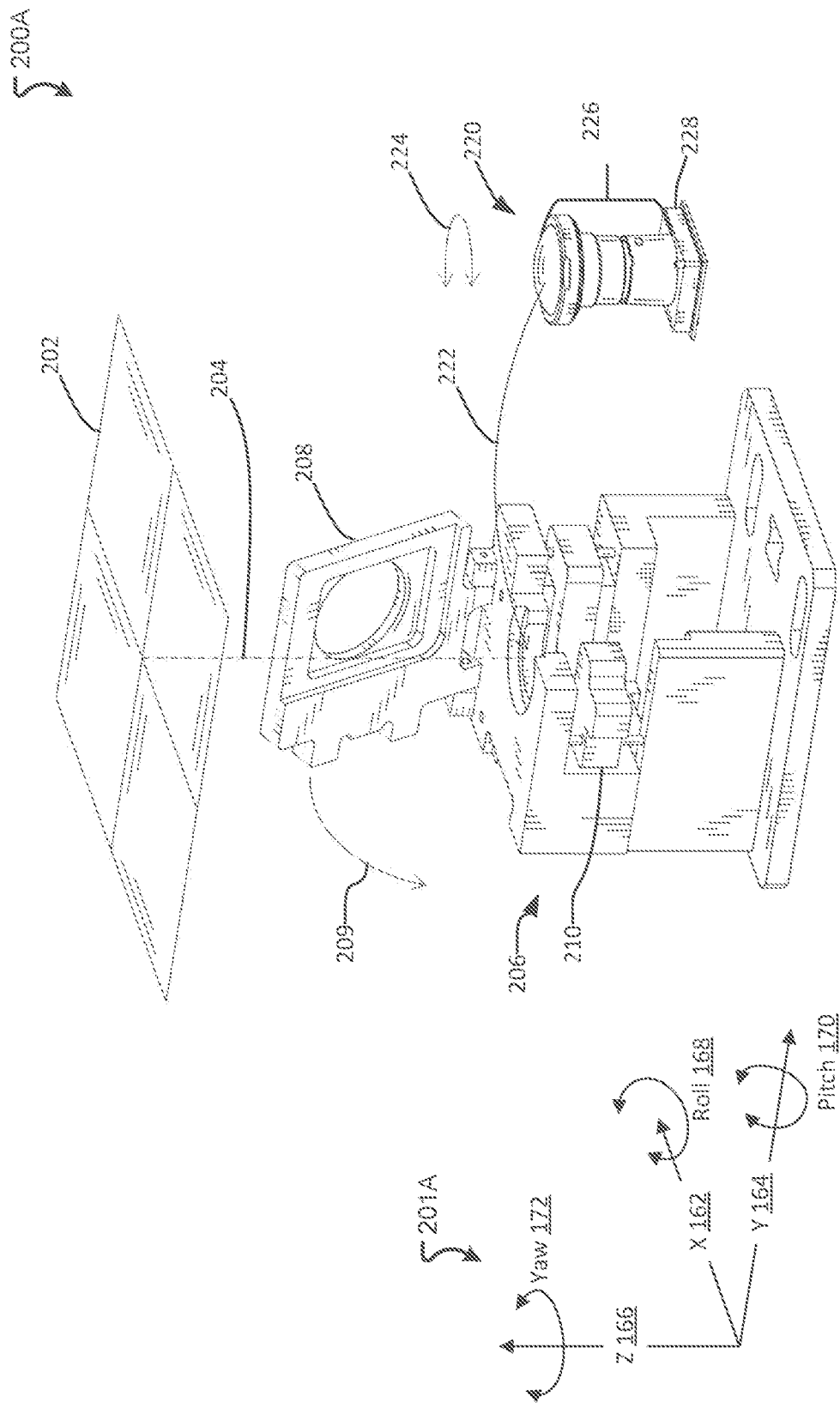
Figure 2D:
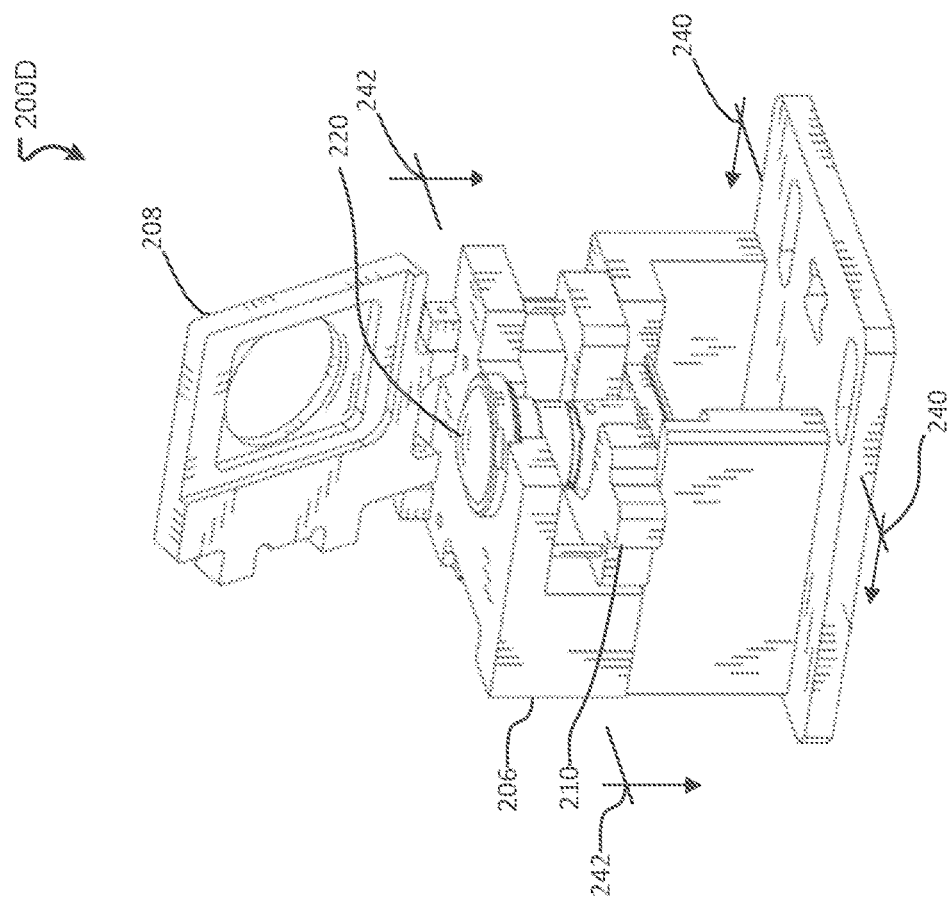
Figure 2B:
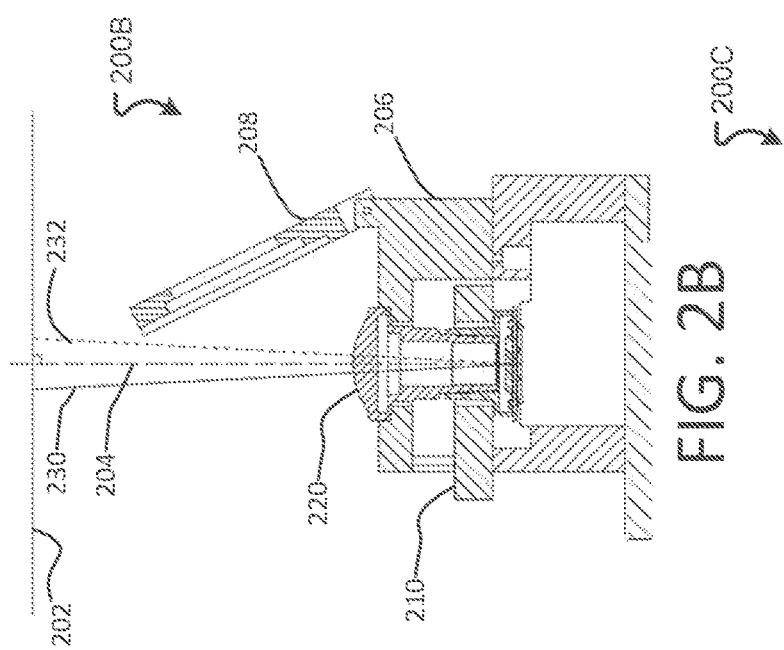

FIG. 2B illustrates a cross-section view of the camera 220 within the kinematic mount 206 along cross-lines 240 of FIG. 2D. Cross-lines 240 represent a position and a direction of the cross section that FIG. 2B illustrates. The apparatus 200B illustrates the kinematic mount 206 with the lens retainer plate 208 raised for illustrative purposes. The lens retainer plate 208 holds the camera 220 in the kinematic mount 206 by closing the lens retainer plate 208. The directed arrow 209 illustrates closing the lens retainer plate 208. The camera alignment plate 210 also holds the camera 220 in the kinematic mount 206. The axis 204 illustrates the axis through the camera 220 (including the lens barrel and the on-board image sensor) and is perpendicular to the target image 202. The axis 230 represents an optical axis with an offset from the image sensor pointing reference as measured for the orientation at 180 degrees. The dashed line 232 represents another optical axis with another offset to the image sensor pointing reference as measured for the orientation at 0-degrees.

Figure 2C:
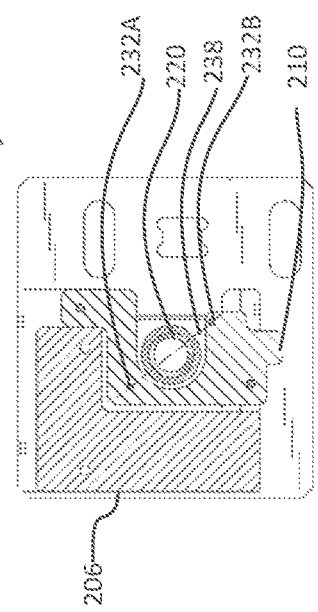

FIG. 2C illustrates a cross-section view along the cross-lines 242 of FIG. 2D of the camera alignment plate 210 when the camera 220 is placed in the kinematic mount 206. Cross-lines 242 represent a position and a direction of the cross section that FIG. 2C illustrates. The apparatus 200C illustrates the camera 220 on the camera alignment plate 210. The apparatus 200C accommodates the camera 220 with the camera alignment plate 210 in the kinematic mount 206. The kinematic mount 206 takes measurements of the offset from the lens optical axis to the image sensor pointing reference. The diagonal line 238 represents positions of two holes 232A-B. In aspects, the diagonal line 238 passes through the lens optical axis of the camera 220. The two holes 232A-B that jointly hold the camera 220 at either 0-degree or at 180-degrees by rotating the camera for 180 degrees and fixing the camera 220 with pins in the two holes 232A-B on the camera alignment plate 210.

FIG. 2D illustrates an example kinematic mount with the camera installed in accordance with aspects of the present disclosure. The apparatus 200D illustrates the kinematic mount 206, the lens retainer plate 208, the camera 220 including the lens barrel affixed to the on-board image sensor, and camera alignment plate 210.

FIGS. 3A-C illustrate examples of optical axes and the image sensor pointing reference and determining offsets of the lens optical axis from the image sensor pointing reference according to aspects of the present disclosure. FIG. 3A and FIG. 3B illustrate examples of target images at orientation of 0-degrees and 180-degrees respectively. In aspects, the offset values from the orientations of 0-degrees and 180 degrees form an opposing pair of the offset values. FIG. 3C depicts an example of determining the total offset based on the two offset values.

In FIG. 3A, the example 300A illustrates positions of the lens optical axis relative to an image sensor pointing reference 306 when the camera is at an orientation of 0-degrees. The camera 302 includes lens 304. The lens optical axis passes through the image sensor pointing reference 306. The horizontal line 320A and the vertical line 322A intersect at a lens optical axis passes through actual optical center 312A. The actual optical center 312A represents a position of an actual optical center in the target image (e.g., the target image 202 in FIG. 2A.) The horizontal line 324A and the vertical line 326A intersect at the point 314A. A measured optical center at a point 314A represents a position of an optical center as measured using the target image. A directed line segment 310A illustrates an offset error from the lens optical axis (i.e., orthogonal to the x-y plane at the image sensor pointing reference 306) to the measured optical center passing through the point 314A. In the example 300A, the offset value is (x, z)=(+6, +3). In aspects, the offset value includes an error caused by mounting of the camera in the kinematic mount.

In FIG. 3B, the example 300B illustrates positions of the lens optical axis relative to the image sensor pointing reference 306 when the camera is at an orientation of 180 degrees. The example 300B differs from the example 300A because the camera 302 has been rotated 180 degrees around the lens optical axis using the kinematic mount (e.g., the kinematic mount 206 in FIG. 2A). The camera 302 includes lens 304. The lens optical axis passes through an image sensor pointing reference 306. The horizontal line 320B and the vertical line 322B intersect at an actual optical center 312B. The actual optical center 312B represents a position of an actual optical center in the target image (e.g., the target image 202 in FIG. 2A). A measured optical center passing through the point 314B represents a position of an optical center as measured using the target image. The horizontal line 324B and the vertical line 326B intersect at the point 314B. A directed line segment 310B illustrates an offset error from the lens optical axis passing through the image sensor pointing reference 306 to the measured optical center passing through the point 314B. In the example 300B, the offset value is (x, z)=(+2, +1). In aspects, the offset values include measurement errors caused by mounting of the camera in the kinematic mount.

FIG. 3C illustrates an example of determining a total offset based on the opposing pair of offset values as measured as shown in FIGS. 3A-B. As shown in the example 300C, there are two offset values and measurement errors from the opposing pair as measured at 0-degrees and 180 degrees. The orientations at 0-degrees and 180 degrees form an opposing pair. Taking an average of the opposing pair cancels a measurement error in the setup of the kinematic mount. For example, the offset 352 values for the orientation of 0-degrees and 180 degrees are respectively (+6, +3) and (+2, +1). Measurement errors in set for the respective measurements are (+2, +1) at the original 0-degree position and (−2, −1) after rotating 180 degrees. The average offset value is (average of +6 and +2, average of +3 and +1)=(+4, +2). As illustrated in the example 300C, the average value of the two measurement errors is (0, 0). The two measurement errors cancel out because they are an opposing pair at 0-degree and 180 degrees. Accordingly, the total offset value is (+2, +1).

In aspects, the total offset represents an offset from the image sensor pointing reference and the lens optical axis. The total offset may be stored in the firmware of the device (e.g., onboard EEPROM) for the on-board image processor to correct distortions in captured images by de-warping.

Figure 4:
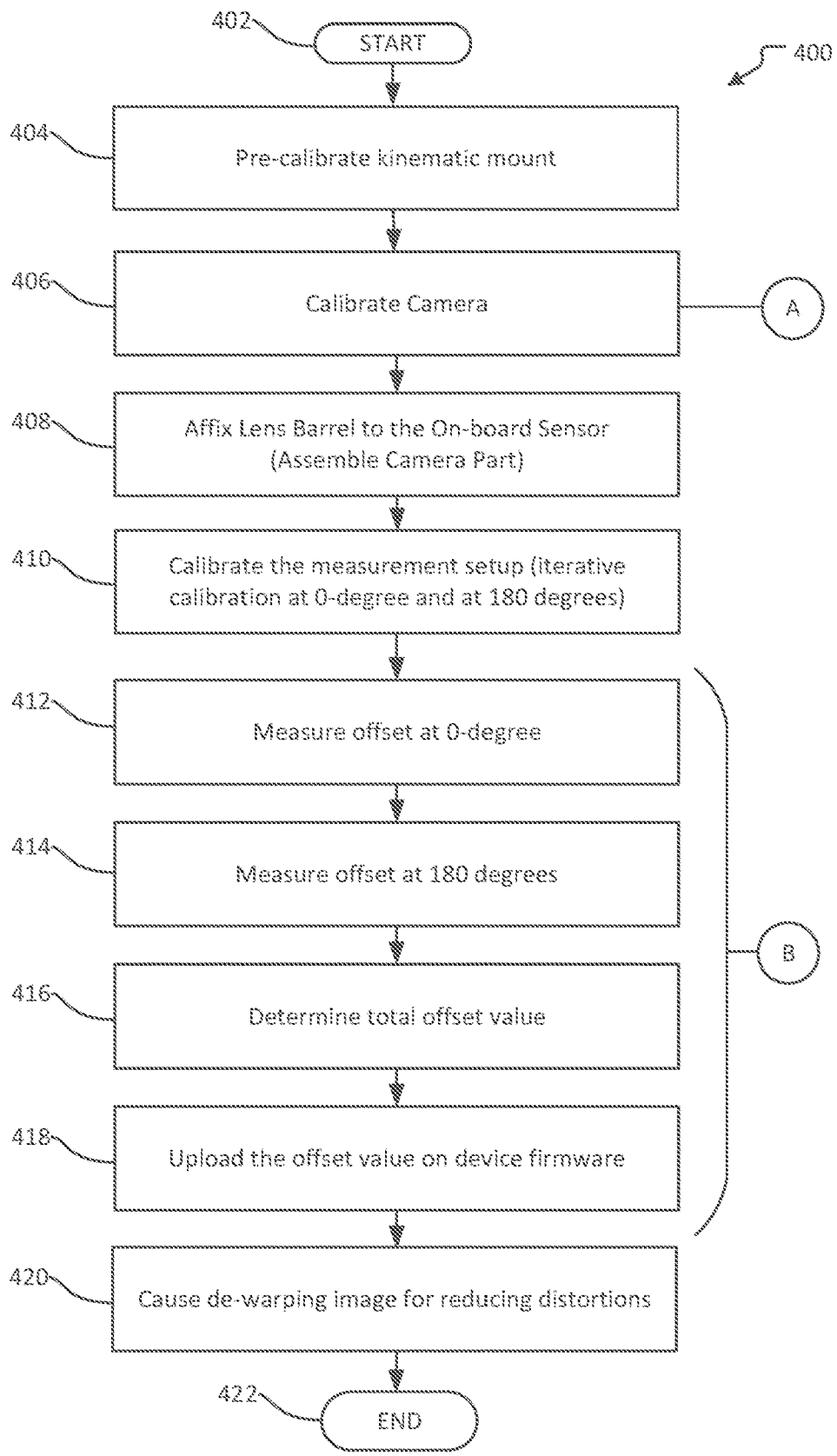
FIG. 4 illustrates an example of a method for calibrating camera and measuring offset values for reducing distortions of images in accordance with aspects of the present disclosure.

FIG. 4 is an example of a method for calibrating camera and measuring offset values for reducing distortions of images in accordance with aspects of the present disclosure. A general order of the operations for the method 400 is shown in FIG. 4. Generally, the method 400 begins with start operation 402 and ends with end operation 422. The method 400 may include more or fewer steps or may arrange the order of the steps differently than those shown in FIG. 4. The method 400 can be executed as a set of computer-executable instructions executed by a computer system and encoded or stored on a computer readable medium. Further, the method 400 can be performed by gates or circuits associated with a processor, an ASIC, an FPGA, a SOC or other hardware device. Hereinafter, the method 400 shall be explained with reference to the systems, components, devices, modules, software, data structures, data characteristic representations, signaling diagrams, methods, etc., described in conjunction with FIGS. 1, 2A-D, 3A-C, 5, 6, 7, and 8A-B.

Following start operation 402, the method 400 begins with align operation 404, which aligns an on-board image sensor. In aspects, the pre-calibrate operation 404 takes place before affixing the on-board image sensor with the lens barrel in assembling the camera. In some aspects, the align operation 404 receives the on-board image sensor in an adjustable mount and positions and orients the on-board image sensor where the lens, or other desired image sensor pointing reference position, passes through the center of the on-board image sensor at a perpendicular angle. In some aspects, the align operation 404 pre-calibrates the kinematic mount as a target setup. The pre-calibration includes aligning the image sensor pointing reference position at a z position from a target and at an x, y position of an optical path to the target (e.g., a laser reference beam aligned to optical axis of target setup).

In aspects, the pre-calibrate operation 404 includes determining a position such that the lens is held in position relative to an object scene containing an imaging target feature at a prescribed z distance. The optical axis as referenced by the lens barrel is placed such that the 0-degrees field angle of lens points to and is aligned with the target feature in a scene. In addition, the adjustable mount holding the image sensor board is placed in a nominal starting position so that the sensor may be aligned with respect to the lens for optimum z focus and x, y position once the pre-calibrate operation 404 completes and aligns the parts. Accordingly, for the module alignment/integration (e.g., sensor alignment to kinematically-mounted lens), a lens is placed in kinematic mount referencing the lens barrel, the sensor is aligned for a desirable focus position z, tip, tilt and minimum x,y deviation of optical center from image sensor pointing reference position. In this case, lens is mounted in the kinematic mount with respect to target features in scene, and image sensor is then aligned to the lens to achieve the desirable focus and minimum optical center error.

In some other aspects, the pre-calibrate operation 404 repeats the pre-calibrate operation until the 0-degrees field angle points to scene target features in the scene.

Calibrate operation 406 calibrates a camera. In aspects, the calibrate operation includes aligning the on-board image sensor and the lens barrel. In aspects, the align operation 406 aligns the lens barrel with the lens optical axis by moving the on-board image sensor in the kinematic mount. The align operation 406 may move the on-board image sensor for an accurate alignment because the on-board image sensor is smaller and lighter than the lens barrel. In aspects, the calibrate operation 406 forms a calibration processing of the camera, as marked by "A.".

Affix operation 408 affixes the on-board image sensor and the lens barrel at the aligned position and orientation. In aspects, the affix operation 408 affixes the on-board image sensor with respect to the lens barrel. The lens barrel includes a lens holder and a gap between the lens holder and the sensor board. The affix operation 408 assembles a camera part of the device.

Calibrate operation 410 calibrates the measurement setup. The measurement setup may include the kinematic mount (e.g., the kinematic mount 206 in FIG. 2A), for example. In aspects, the calibrate operation 410 includes measuring offsets of the lens optical axis relative to the image sensor pointing reference by using a sample camera parts with known offset values. The calibrate operation 410 takes measurements of an opposing pair of orientations at 0-degree and 180 degrees. The calibrate operation 410 may repeat until the error for minimizing the offset of the optical center at the opposing orientation.

Measure operation 412 measures an offset value from the lens optical axis to the optical center at the orientation of 0-degrees. In aspects, the measure operation 412 measures a location of the image sensor pointing reference by capturing a pattern image data and measuring a distance from the lens optical axis to a predetermined location within the pattern image data.

Measure operation 414 measures an offset value the lens optical axis to the optical center at the orientation of 180 degrees. In aspects, the measure operation 412 measures a location of the image sensor pointing reference by capturing a pattern image data and measuring a distance from the lens optical axis to the predetermined location within the pattern image data. Accordingly, the measured offset values from the measure operation 412 and the measure operation 414 form an opposing pair.

Determine operation 416 determines a total offset value. The total offset value may be an average of the measured offset data of the opposing pair. By taking an average, a measurement error of the set up using the kinematic mount may cancel out because the two data are the opposing pair.

Upload operation 418 uploads the determined total offset value to the firmware of the device that embeds the camera. The firmware may store the total offset value for de-warping captured images when the device is in use. In aspects, the device processes captured images, including de-warping the captured images based on the offset value stored in the firmware of the device. By de-warping the captured images based on the offset value, the device eliminates distortions in the captured image. In some aspects, a combination of the measure operation 412, the measure operation 414, the determine operation 416, and the upload operation 418 forms measuring and providing an offset value for correcting distortions of captured images. The combination is marked as "B."

De-warp operation 420 de-warps captured images and reduces distortions in the captured images. The de-warp operation 420 may include transforming the captured images. In aspects, method 400 may end with end operation 422.

As should be appreciated, operations 402-422 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 5:
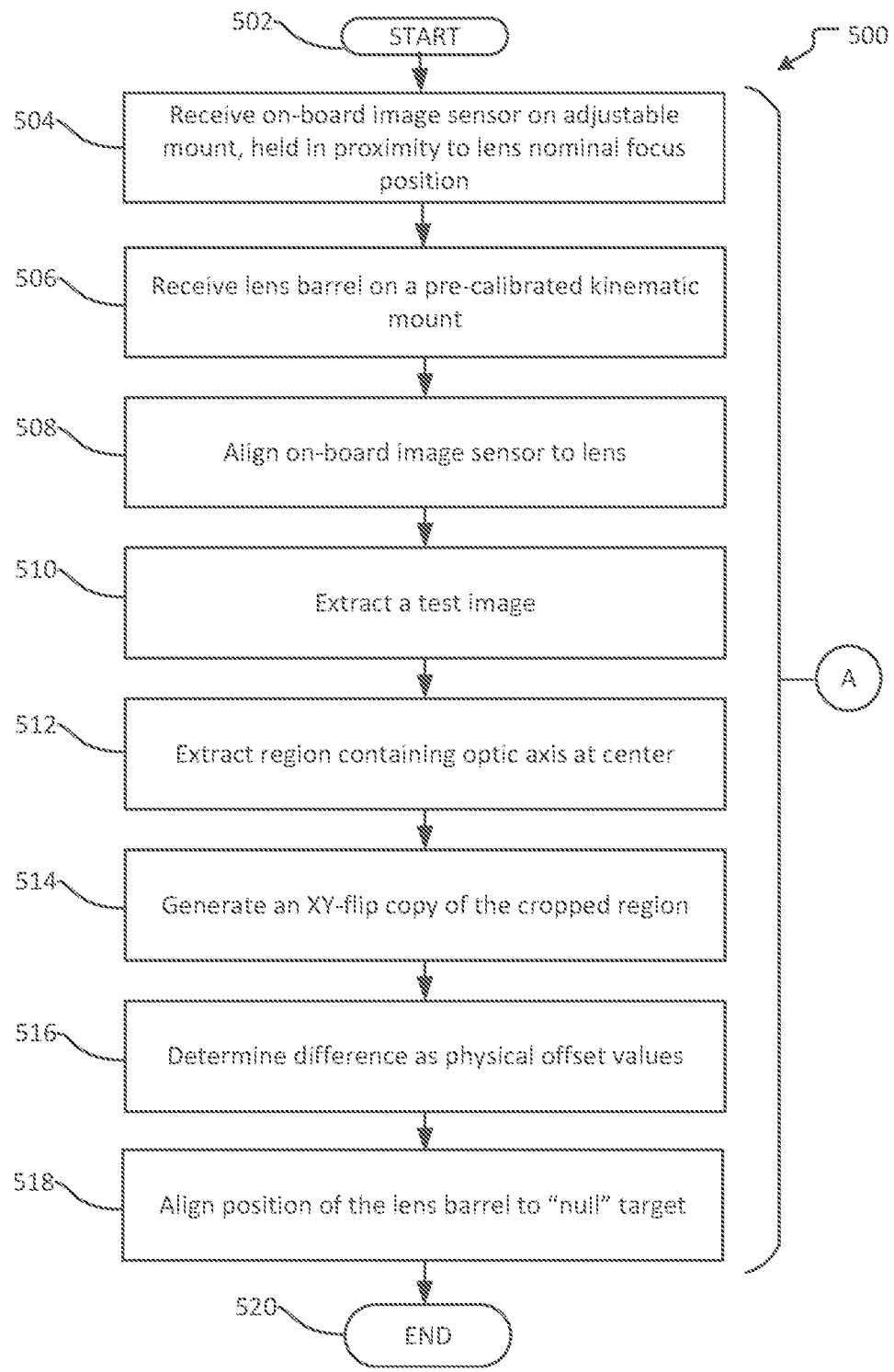
FIG. 5 illustrates an example of a method for aligning part of a camera in accordance with aspects of the present disclosure.

FIG. 5 is an example of a method for calibrating a camera during an assembly (e.g., fabrication) of the camera in accordance with aspects of the present disclosure. A general order of the operations for the method 500 is shown in FIG. 5. Generally, the method 500 begins with start operation 502 and ends with end operation 520. The method 500 may include more or fewer steps or may arrange the order of the steps differently than those shown in FIG. 5. The method 500 can be executed as a set of computer-executable instructions executed by a computer system and encoded or stored on a computer readable medium. Further, the method 500 can be performed by gates or circuits associated with a processor, an ASIC, an FPGA, a SOC or other hardware device. Hereinafter, the method 500 shall be explained with reference to the systems, components, devices, modules, software, data structures, data characteristic representations, signaling diagrams, methods, etc., described in conjunction with FIGS. 1, 2A-D, 3A-C, 4, 6, 7, and 8A-B.

Following start operation 502, the method 500 begins with receive operation 504, which receives the on-board image sensor on the kinematic mount. In aspects, the kinematic mount is a part of a fixture that limits predetermined degrees of freedom on the installed on-board image sensor. The kinematic mount (i.e., the adjustable mount) holds the on-board image sensor in proximity to the lens at nominal focus position.

Receive operation 506 receives the lens barrel on the pre-calibrated kinematic mount. In aspects, the receive operation receives the lens barrel at a predetermined position inside the kinematic mount. The kinematic mount provides repeatability in placing the received lens barrel in predetermined position and orientation by controlling degrees of freedom upon the received lens barrel.

Align operation 508 aligns the on-board image sensor to the lens. The alignment positions the lens at z, tip, tilt and minimum x, y deviation of optical center from image sensor pointing reference position.

Receive operation 510 receives a test image through the lens barrel on the on-board image sensor. The test image provides a set of points on the test image as targets for determining offsets between the lens optical axis and the optical center.

Extract operation 510 crops the captured test image for determining offset values. In aspects, the cropped test image contains an optic axis at the center of the test image.

Generate operation 514 generates an X-Y flip copy of the cropped region In aspects, the X-Y flip copy is an mirror image where the image is flipped along the X axis toward the Y axis for determining the offset values.

Determine operation 516 determines the offset values based on difference between cropped region and the X-Y flip copy. In aspects, the determine operation 516 includes superimposing the cropped region and the X-Y flip copy for identifying an offset of pixels between the center of the cropped region and the center of the X-Y flip copy. In some aspects, the type of features and size of area of the chart may be used to indicate how well nulled is the absolute value of the difference between the cropped image (i.e., a region of interest, ROI) and X, Y-flipped image. For course offset errors, the features in the combined output image appear expanded in width, whereas fine offset errors result in tighter width of the feature region. Further, for case where chart features include radial spatial frequencies (e.g., a star chart), the feature area of the combined output image may contain higher or lower spatial frequency content dependent on offset error. For minimal offset approaching zero offset, the output may appear "nulled" (e.g., all dark, all white, or all gray), depending on the number of spokes of star chart and rotational position of the star chart. In some aspects, the aliased pattern and shape indicates a direct correlation with offset and direction, thus offset position. By using a feature imaged to have a large area of pixels, sub-pixel accuracy may be achieved by leveraging the full area of pixels representing the chart area.

Align operation 518 aligns the position of the lens barrel to "null" (e.g., canceling out) the target between the cropped region and the X-Y flip copy. In aspects, method 500 may end with end operation 520.

As should be appreciated, operations 502-520 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 6:
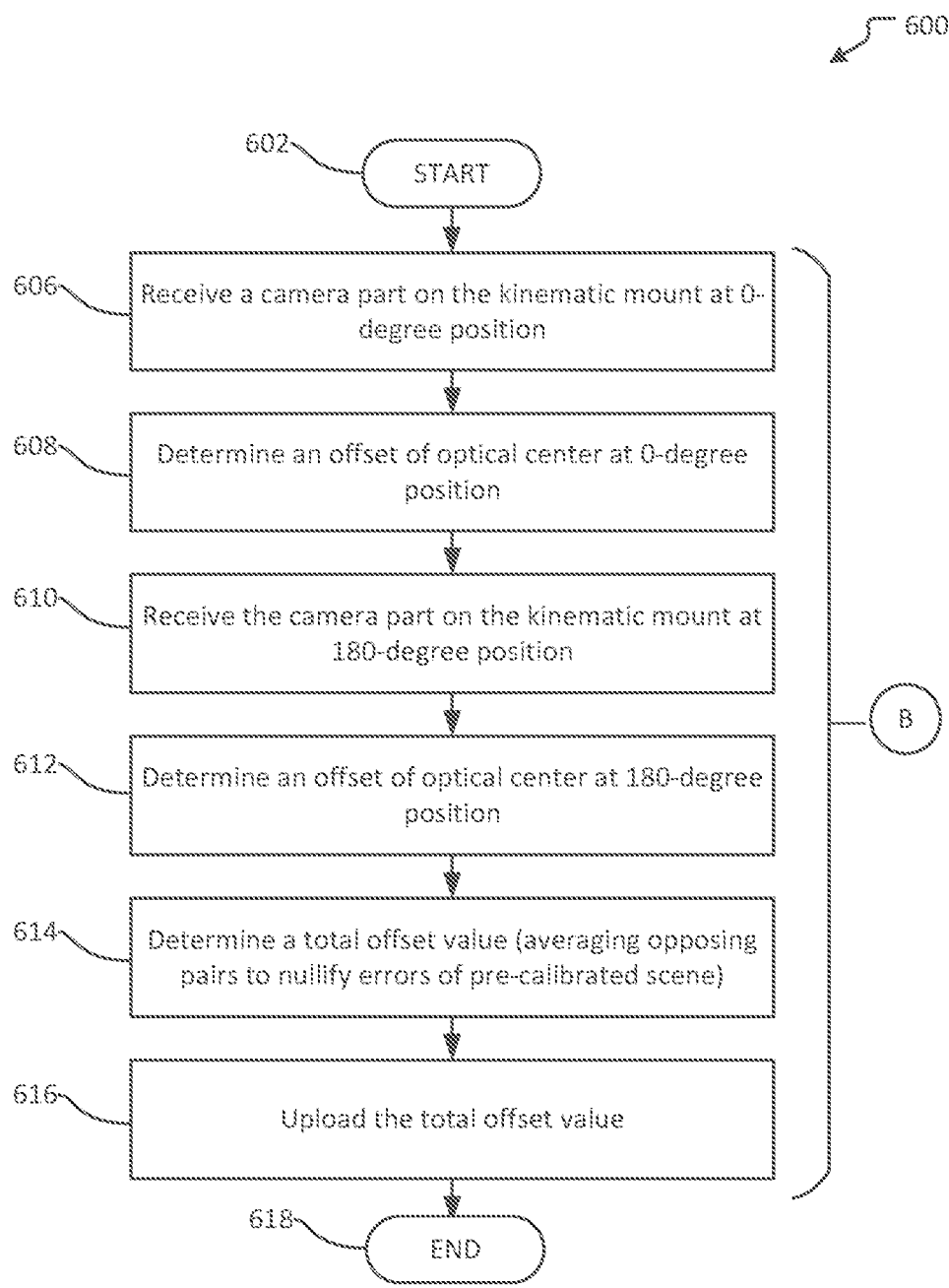
FIG. 6 illustrates an example of a method for determining an offset associated with an optical axes in accordance with aspects of the present disclosure

FIG. 6 is an example of a method for calibrating a camera during an assembly (e.g., fabrication) of the camera in accordance with aspects of the present disclosure. A general order of the operations for the method 600 is shown in FIG. 6. Generally, the method 600 begins with start operation 602 and ends with end operation 618. The method 600 may include more or fewer steps or may arrange the order of the steps differently than those shown in FIG. 6. The method 600 can be executed as a set of computer-executable instructions executed by a computer system and encoded or stored on a computer readable medium. Further, the method 600 can be performed by gates or circuits associated with a processor, an ASIC, an FPGA, a SOC or other hardware device. Hereinafter, the method 600 shall be explained with reference to the systems, components, devices, modules, software, data structures, data characteristic representations, signaling diagrams, methods, etc., described in conjunction with FIGS. 1, 2A-D, 3A-C, 4, 5, 7, and 8A-B.

Following start operation 602, the method 600 begins with receive operation 606, which receives the camera on the kinematic mount at the 0-degrees orientation. In aspects, the kinematic mount is a part of a fixture that limits predetermined degrees of freedom on the installed on-board image sensor.

Determine operation 608 determines an offset value from the lens optical axis to the image sensor pointing reference when the camera is at the 0-degrees orientation. The determine operation 608 determines the offset value by taking an image of a target pattern with a reference point. In aspects, the offset value is a distance from the lens optical axis, which intersects image sensor at the optical center, to the image sensor pointing reference, which depending on application may be defined (e.g., center or offset position of the image) as a reference point on the image.

Receive operation 610 receives the camera on the kinematic mount at the 180-degrees orientation. In aspects, the kinematic mount controls the degree of freedom of the camera installed in the kinematic mount. For example, the kinematic mount includes a camera align place with a set of pins that fixes an orientation of the camera at either 0 degrees or at 180 degrees. The kinematic mount restricts all other movement of the camera.

Determine operation 612 determines an offset value from the lens optical axis to the image sensor pointing reference when the camera is at the 180-degrees orientation. As detailed above for determining the offset value for the 0-degrees orientation, the determine operation 612 determines the offset value by taking an image of a target pattern with a reference point. The offset value is a distance from the lens optical axis, which intersects image sensor at the optical center, to the image sensor pointing reference, which depending on application may be defined (e.g., center or offset position of the image) as a reference point on the image.

Determine operation 614 determines a total offset value from the lens optical axis to the image sensor pointing reference based on the opposing pair of offset values with orientations at 0-degrees and 180 degrees. In aspects, the two orientations may be at other azimuth, or clocking, angles that are 180 degrees apart. Further, more than one opposing pair may be used in determining optical center offset values (e.g., 0-degrees and 180-degrees, 90-degrees and 270-degrees, 45-degrees and 235-degrees, etc.). The average of these actual offset values determined from opposing pairs comprises the final optical center offset values to be used or stored. When the opposing pair is 180 degrees apart, the determine operation 614 determines the total offset by generating an average of the opposing pair. The determine operation 614 cancels out (i.e., "nullify") errors that are rotationally symmetrical. The rotationally symmetrical errors may include an error in setting up the camera in the kinetic mount.

Upload operation 616 uploads the total offset value to the firmware of the device. The firmware may store the total offset value in a memory of the client. The device may use the total offset value among parameters for an image processor to de-warp captured images. The de-warping of the captured images based on the total offset value reduces distortions of the captured images. In aspects, method 600 may end with end operation 618.

As should be appreciated, operations 606-616 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 7:
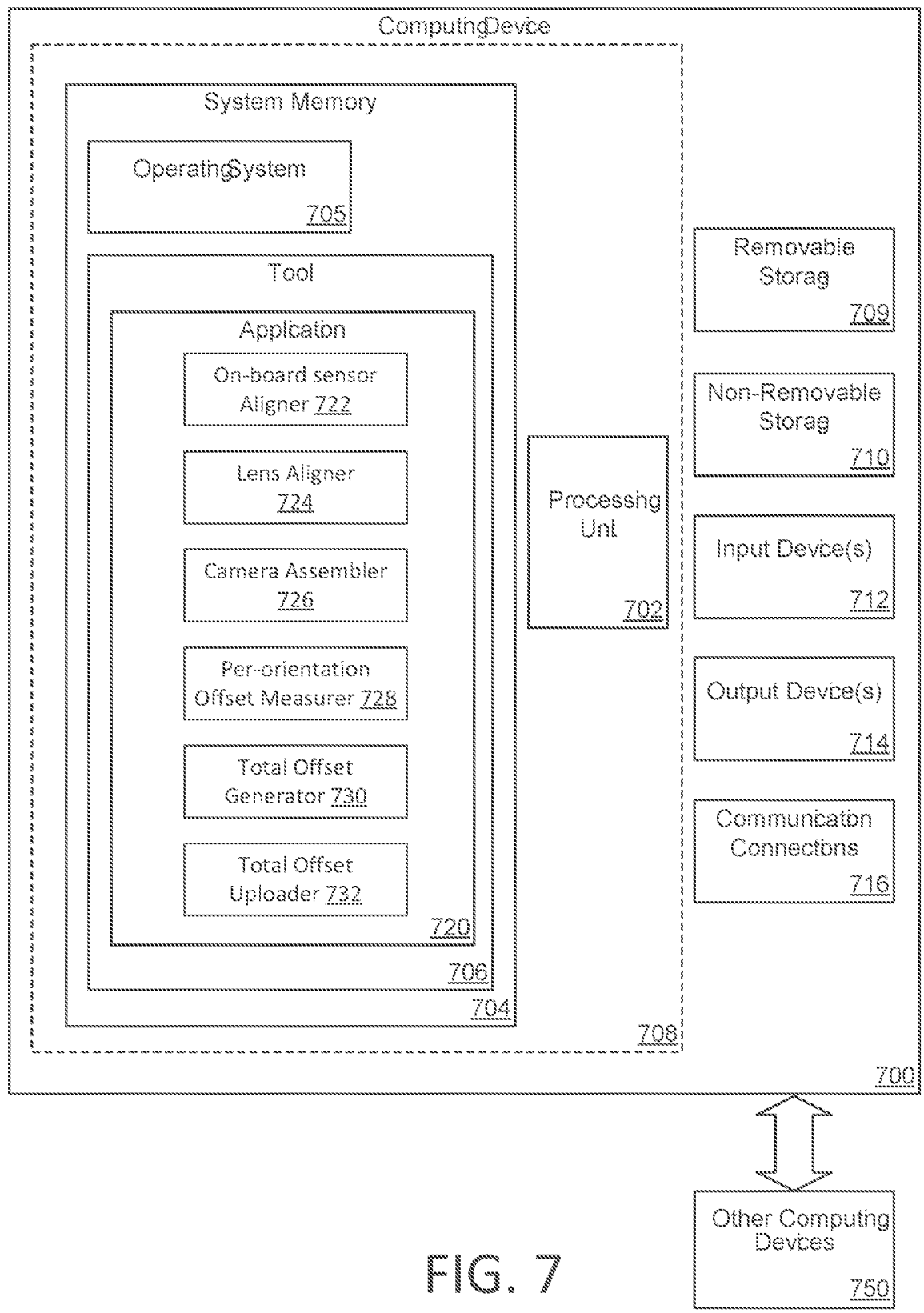
FIG. 7 is a block diagram illustrating example physical components of a computing device with which aspects of the disclosure may be practiced.

FIG. 7 is a block diagram illustrating physical components (e.g., hardware) of a computing device 700 with which aspects of the disclosure may be practiced. The computing device components described below may be suitable for the computing devices described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program tools 706 suitable for performing the various aspects disclosed herein such. The operating system 705, for example, may be suitable for controlling the operation of the computing device 700. Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program tools and data files may be stored in the system memory 704. While executing on the at least one processing unit 702, the program tools 706 (e.g., an application 720) may perform processes including, but not limited to, the aspects, as described herein. The application 720 includes an on-board image sensor aligner 722, a lens aligner 724, a lens affixer 726, a per-orientation offset measurer 728, a total offset generator 730, and a total offset uploader 732, as described in more detail with regard to FIG. 1A. Other program tools that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units, and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 700 may also have one or more input device(s) 712, such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
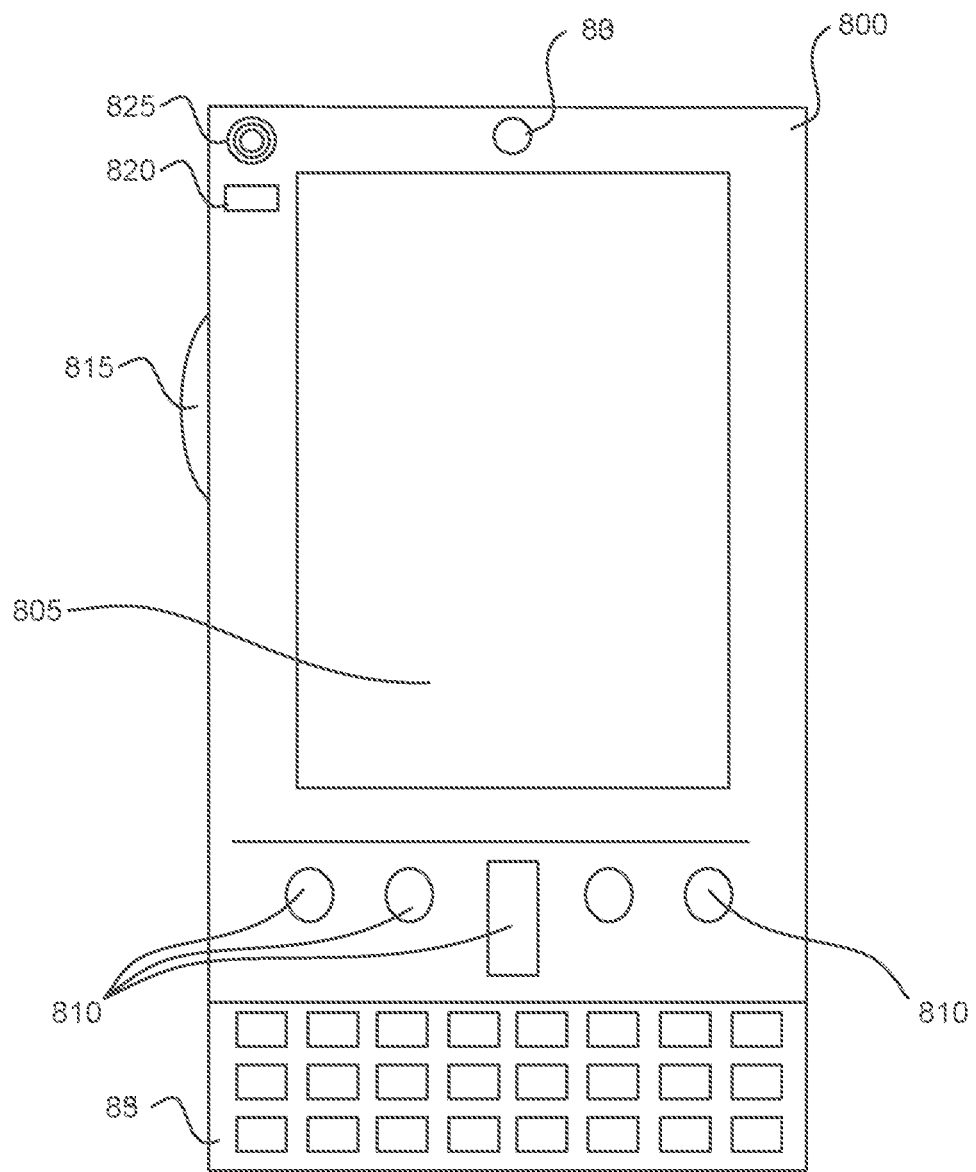
FIG. 8A is a simplified diagram of a mobile computing device with which aspects of the present disclosure may be practiced.
Figure 8B:
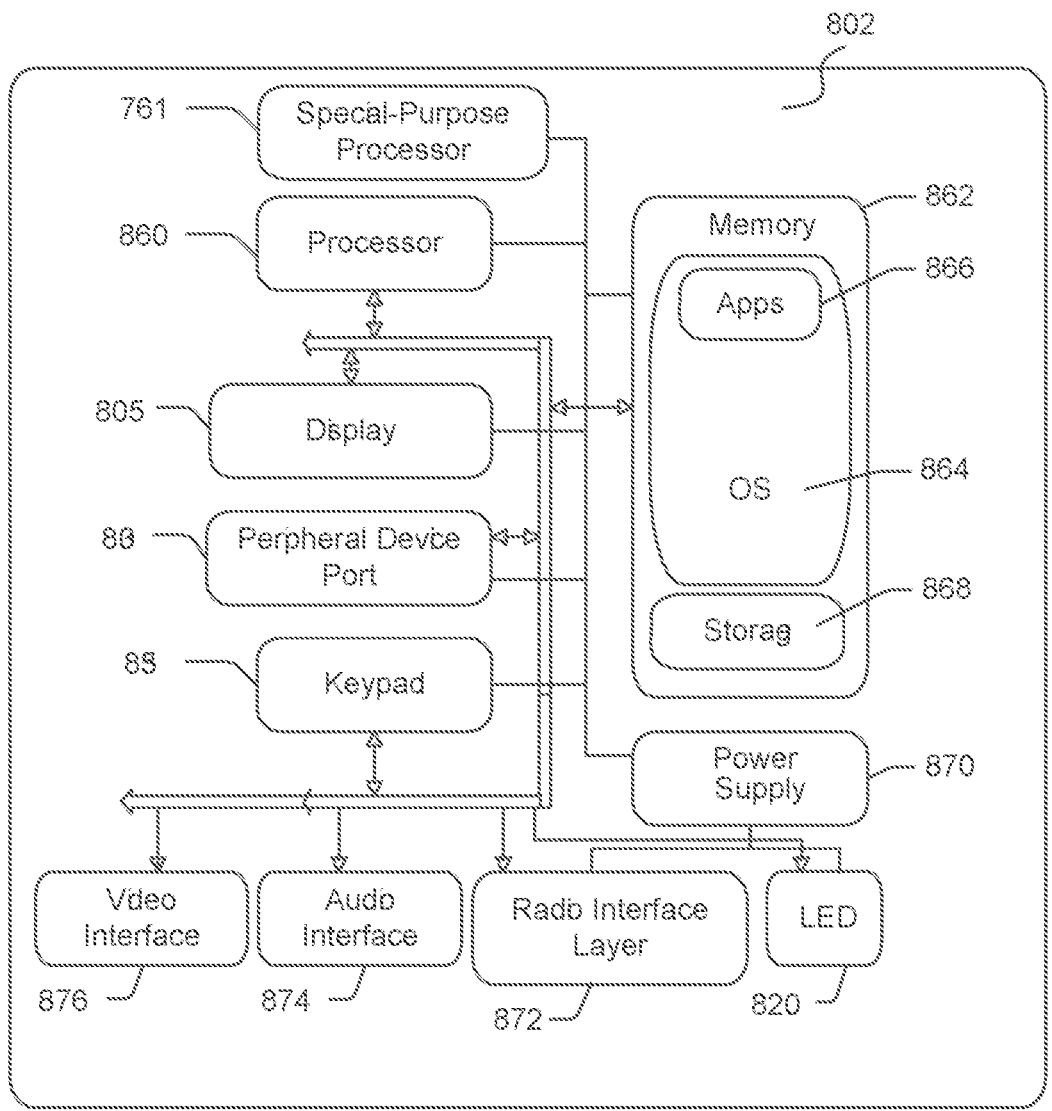
FIG. 8B is another simplified block diagram of a mobile computing device with which aspects of the present disclosure may be practiced.

FIGS. 8A and 8B illustrate a computing device or mobile computing device 800, for example, a mobile telephone, a smart phone, wearable computer (such as a smart watch), a tablet computer, a laptop computer, and the like, with which aspects of the disclosure may be practiced. In some aspects, the client utilized by a user (e.g., user of client device A 102A and user of client device B 102B in FIG. 1A) may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included as an optional input element, a side input element 815 allows further user input. The side input element 815 may be a rotary switch, a button, or any other type of manual input element. In alternative aspects, mobile computing device 800 may incorporate more or less input elements. For example, the display 805 may not be a touch screen in some aspects. In yet another alternative aspect, the mobile computing device 800 is a portable phone system, such as a cellular phone. The mobile computing device 800 may also include an optional keypad 835. Optional keypad 835 may be a physical keypad or a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of computing device (e.g., the device 102 in FIG. 1A), a server, a mobile computing device, etc. That is, the mobile computing device 800 can incorporate a system 802 (e.g., a system architecture) to implement some aspects. The system 802 can implemented as a "smart phone" capable of running one or more applications (e.g., browser, e-mail, calendaring, contact managers, messaging clients, games, and media clients/players). In some aspects, the system 802 is integrated as a computing device, such as an integrated digital assistant (PDA) and wireless phone.

One or more application programs 866 may be loaded into the memory 862 and run on or in association with the operating system 864. Examples of the application programs include phone dialer programs, e-mail programs, information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein.

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 (e.g., LED) may be used to provide visual notifications, and/or an audio interface 874 may be used for producing audible notifications via the audio transducer 825. In the illustrated configuration, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with aspects of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

The description and illustration of one or more aspects provided in this application are not intended to limit or restrict the scope of the disclosure as claimed in any way. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

As will be understood from the foregoing disclosure the present disclosure relates to a computer-implemented method of reducing distortions in mage data. The method comprises determining, using a kinematic mount for an alignment, a physical offset value associated with a position and an orientation of an on-board image sensor and a lens, assembling a camera, wherein the camera includes the on-board image sensor and the lens affixed based on the physical offset value, determining a pair of offset values, wherein each of the pair of offset values corresponds to an offset as an optical center from an optical axis and an image sensor pointing reference of the camera, generating, based on the determined pair of offset values, a total offset value, and causing a device to store the total offset value for reducing the distortions of image data. Additionally, the method includes receiving the on-board image sensor in the kinematic mount, aligning the on-board image sensor using a reference light beam, receiving a lens barrel in the kinematic mount, wherein the lens barrel includes the lens. generating, based on incoming light through the lens barrel, an image on the on-board image sensor, extracting a region of the image, wherein the region includes an lens optical axis, generating a flip copy of the extracted region, and determining, based on the extracted region and the flip copy, the physical offset value. The kinematic mount controls one or more degrees of freedom, wherein the one or more degrees of freedom include at least one of: a surge position along the x-axis, a sway position along the y-axis, a heave position along the z-axis, a roll orientation around the x-axis, a pitch orientation around the y-axis, or a yaw orientation around the z-axis. The method further includes receiving, by the kinematic mount, the camera at a first orientation, determining, based on the camera received in the kinematic mount at the first orientation, a first offset value, receiving, by the kinematic mount, the camera at a second orientation, determining, based on the camera received in the kinematic mount at the second orientation, a second offset value, wherein the second orientation is 180 degrees apart from the first orientation in yaw, and generating, based on the first offset value and the second offset value, the pair of offset values. The first orientation corresponds to zero degrees in the yaw, and wherein the second orientation corresponds to 180 degrees in the yaw, and wherein the total offset value includes an average value of the pair of offset values. The kinematic mount includes at least one degree of freedom including the yaw. The kinematic mount includes a lens retainer, a camera alignment plate including a plurality of pins for securing the camera in a pair of predetermined opposing orientations, and a cavity configured to receive the camera secured on the camera alignment plate.

Another aspect of the technology relates to a system for determining an offset for reducing distortions of an image. The system includes a processor; and a memory storing computer-executable instructions that when executed by the processor cause the system to: determine, using a kinematic mount for an alignment, a physical offset value associated with a position and an orientation of an on-board image sensor and a lens, assemble a camera, wherein the camera includes the on-board image sensor and the lens affixed based on the physical offset value, determine a pair of offset values, wherein each of the pair of offset values corresponds to an offset as an optical center from an optical axis and an image sensor pointing reference optical center of the camera, generate, based on the determined pair of offset values, a total offset value, and cause a device to store the total offset value for reducing distortions of image data. The computer-executable instructions when executed further causing the system to: receive the on-board image sensor in the kinematic mount, align the on-board image sensor using a reference light beam, receive a lens barrel in the kinematic mount, wherein the lens barrel includes the lens, generate, based on incoming light through the lens barrel, an image on the on-board image sensor, extract a region of the image, wherein the region includes an lens optical axis, generate a flip copy of the extracted region, and determine, based on the extracted region and the flip copy, the physical offset value. The kinematic mount controls one or more degrees of freedom, wherein the one or more degrees of freedom include at least one of: a surge position along the x-axis, a sway position along the y-axis, a heave position along the z-axis, a roll orientation around the x-axis, a pitch orientation around the y-axis, or a yaw orientation around the z-axis. The computer-executable instructions when executed further causing the system to: receive, by the kinematic mount, the camera at a first orientation, determine, based on the camera received in the kinematic mount at the first orientation, a first offset value, receive, by the kinematic mount, the camera at a second orientation, determine, based on the camera received in the kinematic mount at the second orientation, a second offset value, wherein the second orientation is 180 degrees apart from the first orientation in yaw, and generate, based on the first offset value and the second offset value, the pair of offset values. The first orientation corresponds to zero degrees in the yaw, and wherein the second orientation corresponds to 180 degrees in the yaw, and wherein the total offset value includes an average value of the pair of offset values. The kinematic mount includes at least one degree of freedom including the yaw. The kinematic mount includes a lens retainer, a camera alignment plate including a plurality of pins for securing the camera in a pair of predetermined opposing orientations, and a cavity configured to receive the camera secured on the camera alignment plate.

Yet another aspect of the technology relates to a kinematic mount device. The device includes a physical offset determiner configured to determine a physical offset value associated with a position and an orientation of an on-board image sensor and a lens, a camera assembler configured to assemble a camera, wherein the camera includes the on-board image sensor and the lens affixed based on the physical offset value, an offset determiner configured to determine a pair of offset values, wherein each of the pair of offset values corresponds to an offset as an optical center from an optical axis and an image sensor pointing reference of the camera, a total offset determiner configured to generate, based on the determined pair of offset values, a total offset value, wherein the total offset determiner is further configured to cause to store the total offset value for reducing distortions of image data. The device further includes an on-board image sensor receiver configured to receive the on-board image sensor on a kinematic mount, an on-board image sensor aligner configured to align the on-board image sensor using a reference light beam, a lens barrel receiver configured to receive a lens barrel in the kinematic mount, wherein the lens barrel includes the lens, an image generator configured to generate, based on incoming light through the lens barrel, an image on the on-board image sensor, a region extractor configured to extract a region of the image, wherein the region includes a lens optical axis, a flip copy generator configured to generate a flip copy of the extracted region, and a physical offset determiner configured to determine, based on the extracted region and the flip copy, the physical offset value. The kinematic mount device controls one or more degrees of freedom, wherein the one or more degrees of freedom include at least one of: a surge position along the x-axis, a sway position along the y-axis, a heave position along the z-axis, a roll orientation around the x-axis, a pitch orientation around the y-axis, or a yaw orientation around the z-axis. The device further includes a first camera receiver configured to receive the camera at a first orientation, a first offset determiner configured to determine, based on the camera received in a kinematic mount at the first orientation, a first offset value, a second camera receiver configured to receive, by the kinematic mount, the camera at a second orientation, a second offset determiner configured to determine, based on the camera received in the kinematic mount at the second orientation, a second offset value, wherein the second orientation is 180 degrees apart from the first orientation in the yaw, and a total offset generator configured to generate, based on the first offset value and the second offset value, the pair of offset values. The first orientation corresponds to zero degrees in the yaw, and wherein the second orientation corresponds to 180 degrees in the yaw orientation, and wherein the total offset value includes an average value of the pair of offset values.

Any of the one or more above aspects in combination with any other of the one or more aspect. Any of the one or more aspects as described herein.

What is claimed is:

1. A computer-implemented method of reducing distortions in image data, the method comprising:
   determining, using a kinematic mount for an alignment, a physical offset value associated with a position and an orientation of an on-board image sensor and a lens respectively received in the kinematic mount;
   assembling a camera, wherein the camera includes the on-board image sensor and the lens affixed based on the physical offset value;
   determining a pair of offset values, wherein each of the pair of offset values corresponds to an offset as an optical center from an optical axis and an image sensor pointing reference of the camera received in the kinematic mount;
   generating, based on the determined pair of offset values, a total offset value; and
   causing a device to store the total offset value for reducing the distortions of image data.

2. The computer-implemented method of claim 1, the method further comprising:
   receiving the on-board image sensor in the kinematic mount;
   aligning the on-board image sensor using a reference light beam;
   receiving a lens barrel in the kinematic mount, wherein the lens barrel includes the lens;
   generating, based on incoming light through the lens barrel, an image on the on-board image sensor;
   extracting a region of the image, wherein the region includes a lens optical axis;
   generating a flip copy of the extracted region; and
   determining, based on the extracted region and the flip copy, the physical offset value.

3. The computer-implemented method of claim 2, wherein the flip copy is a flipped copy of the extracted region along an x-axis of the extracted region.

4. The computer-implemented method of claim 1, wherein the kinematic mount controls one or more degrees of freedom, wherein the one or more degrees of freedom include at least one of:
   a surge position along the x-axis,
   a sway position along the y-axis,
   a heave position along the z-axis,
   a roll orientation around the x-axis,
   a pitch orientation around the y-axis, or
   a yaw orientation around the z-axis.

5. The computer-implemented method of claim 1, the method further comprising:
   receiving, by the kinematic mount, the camera at a first orientation;
   determining, based on the camera received in the kinematic mount at the first orientation, a first offset value;
   receiving, by the kinematic mount, the camera at a second orientation;
   determining, based on the camera received in the kinematic mount at the second orientation, a second offset value, wherein the second orientation is 180 degrees apart from the first orientation in yaw; and
   generating, based on the first offset value and the second offset value, the pair of offset values.

6. The computer-implemented method of claim 5, wherein the first orientation corresponds to zero degrees in the yaw, and wherein the second orientation corresponds to 180 degrees in the yaw, and wherein the total offset value includes an average value of the pair of offset values.

7. The computer-implemented method of claim 5, wherein the kinematic mount includes at least one degree of freedom including the yaw.

8. The computer-implemented method of claim 5, wherein the kinematic mount includes a lens retainer, a camera alignment plate including a plurality of pins for securing the camera in a pair of predetermined opposing orientations, and a cavity configured to receive the camera secured on the camera alignment plate.

9. A system for determining an offset for reducing distortions of an image, the system comprising:
  a processor; and
  a memory storing computer-executable instructions that when executed by the processor cause the system to:
    determine, using a kinematic mount for an alignment, a physical offset value associated with a position and an orientation of an on-board image sensor and a lens received in the kinematic mount;
    assemble a camera, wherein the camera includes the on-board image sensor and the lens affixed based on the physical offset value;
    determine a pair of offset values, wherein each of the pair of offset values corresponds to an offset as an optical center from an optical axis and an image sensor pointing reference of the camera received in the kinematic mount;
    generate, based on the determined pair of offset values, a total offset value; and
    cause a device to store the total offset value for reducing distortions of image data.

10. The system of claim 9, the computer-executable instructions when executed further causing the system to:
  receive the on-board image sensor in the kinematic mount;
  align the on-board image sensor using a reference light beam;
  receive a lens barrel in the kinematic mount, wherein the lens barrel includes the lens;
  generate, based on incoming light through the lens barrel, an image on the on-board image sensor;
  extract a region of the image, wherein the region includes a lens optical axis;
  generate a flip copy of the extracted region; and
  determine, based on the extracted region and the flip copy, the physical offset value.

11. The system of claim 9, wherein the kinematic mount controls one or more degrees of freedom, wherein the one or more degrees of freedom include at least one of:
  a surge position along the x-axis,
  a sway position along the y-axis,
  a heave position along the z-axis,
  a roll orientation around the x-axis,
  a pitch orientation around the y-axis, or
  a yaw orientation around the z-axis.

12. The system of claim 9, the computer-executable instructions when executed further causing the system to:
  receive, by the kinematic mount, the camera at a first orientation;
  determine, based on the camera received in the kinematic mount at the first orientation, a first offset value;
  receive, by the kinematic mount, the camera at a second orientation;
  determine, based on the camera received in the kinematic mount at the second orientation, a second offset value, wherein the second orientation is 180 degrees apart from the first orientation in yaw; and
  generate, based on the first offset value and the second offset value, the pair of offset values.

13. The system of claim 12, wherein the first orientation corresponds to zero degrees in the yaw, and wherein the second orientation corresponds to 180 degrees in the yaw, and wherein the total offset value includes an average value of the pair of offset values.

14. The system of claim 12, wherein the kinematic mount includes at least one degree of freedom including the yaw.

15. The system of claim 12, wherein the kinematic mount includes a lens retainer, a camera alignment plate including a plurality of pins for securing the camera in a pair of predetermined opposing orientations, and a cavity configured to receive the camera secured on the camera alignment plate.

16. A kinematic mount device, the device comprising:
  a physical offset determiner configured to determine, using a kinematic mount for an alignment, a physical offset value associated with a position and an orientation of an on-board image sensor and a lens received in the kinematic mount;
  a camera assembler configured to assemble a camera, wherein the camera includes the on-board image sensor and the lens affixed based on the physical offset value;
  an offset determiner configured to determine a pair of offset values, wherein each of the pair of offset values corresponds to an offset as an optical center from an optical axis and an image sensor pointing reference of the camera received in the kinematic mount;
  a total offset determiner configured to generate, based on the determined pair of offset values, a total offset value, wherein the total offset determiner is further configured to cause to store the total offset value for reducing distortions of image data.

17. The kinematic mount device of claim 16, the device further comprising:
  an on-board image sensor receiver configured to receive the on-board image sensor on a kinematic mount;
  an on-board image sensor aligner configured to align the on-board image sensor using a reference light beam;
  a lens barrel receiver configured to receive a lens barrel in the kinematic mount, wherein the lens barrel includes the lens;
  an image generator configured to generate, based on incoming light through the lens barrel, an image on the on-board image sensor;
  a region extractor configured to extract a region of the image, wherein the region includes a lens optical axis;
  a flip copy generator configured to generate a flip copy of the extracted region; and
  a physical offset determiner configured to determine, based on the extracted region and the flip copy, the physical offset value.

18. The kinematic mount device of claim 16, wherein the kinematic mount device controls one or more degrees of freedom, wherein the one or more degrees of freedom include at least one of:
  a surge position along the x-axis,
  a sway position along the y-axis,
  a heave position along the z-axis,
  a roll orientation around the x-axis,
  a pitch orientation around the y-axis, or
  a yaw orientation around the z-axis.

19. The kinematic mount device of claim 16, the device further comprising:
  a first camera receiver configured to receive the camera at a first orientation;
  a first offset determiner configured to determine, based on the camera received in a kinematic mount at the first orientation, a first offset value;

a second camera receiver configured to receive, by the kinematic mount, the camera at a second orientation;

a second offset determiner configured to determine, based on the camera received in the kinematic mount at the second orientation, a second offset value, wherein the second orientation is 180 degrees apart from the first orientation in the yaw; and a total offset generator configured to generate, based on the first offset value and the second offset value, the pair of offset values.

20. The kinematic mount device of claim 19, wherein the first orientation corresponds to zero degrees in the yaw, and wherein the second orientation corresponds to 180 degrees in the yaw orientation, and wherein the total offset value includes an average value of the pair of offset values.

* * * * *